United States Patent
Stevens (10) Patent No.: US 9,013,756 B2
(45) Date of Patent: Apr. 21, 2015

(54) BLENDED HALFTONE WITH MIXED DOT SIZES FOR OBJECT ORIENTED HALFTONES

(71) Applicant: Xerox Corporation, Norwalk, CT (US)

(72) Inventor: Michael Dale Stevens, Portland, OR (US)

(73) Assignee: Xerox Corporation, Norwalk, CT (US)

(*) Notice: Subject to any disclaimer, the term of this patent is extended or adjusted under 35 U.S.C. 154(b) by 0 days.

(21) Appl. No.: 14/020,381

(22) Filed: Sep. 6, 2013

(65) Prior Publication Data
US 2015/0070731 A1    Mar. 12, 2015

(51) Int. Cl.
  *G06K 15/00* (2006.01)
  *H04N 1/405* (2006.01)
(52) U.S. Cl.
  CPC .................................. *H04N 1/4055* (2013.01)
(58) Field of Classification Search
  None
  See application file for complete search history.

(56) References Cited

U.S. PATENT DOCUMENTS

| 5,694,224 A | 12/1997 | Tai | |
| 6,643,030 B1 * | 11/2003 | Loce et al. | 358/1.9 |
| 7,079,281 B1 | 7/2006 | Ng | |
| 7,079,287 B1 * | 7/2006 | Ng et al. | 358/2.1 |
| 7,688,473 B2 | 3/2010 | Purdum et al. | |
| 2006/0007468 A1 | 1/2006 | Tanaka | |
| 2007/0285695 A1 * | 12/2007 | Hains et al. | 358/1.9 |
| 2008/0192297 A1 | 8/2008 | Wang | |
| 2013/0027752 A1 * | 1/2013 | Park et al. | 358/3.06 |

* cited by examiner

*Primary Examiner* — Vincent Rudolph
*Assistant Examiner* — Michael Burleson (57) ABSTRACT

A method, non-transitory computer readable medium, and apparatus for printing is disclosed. For example, the method selects a first frequency and a first angle for a low frequency halftone, selects a second frequency and a second angle for a high frequency halftone, wherein the high frequency halftone comprises a large dot cluster and a small dot cluster, tags each one of one or more objects in an image to be printed, selects a low frequency halftone or a high frequency halftone for the each one of the one or more objects that are tagged and prints the image in accordance with the low frequency halftone or the high frequency halftone that is selected for the each one of the one or more objects that are tagged.

18 Claims, 5 Drawing Sheets

BLENDED HALFTONE WITH MIXED DOT SIZES FOR OBJECT ORIENTED HALFTONES

The present disclosure relates generally to improving halftone images and, more particularly, to a method and an apparatus for providing a blended halftone with mixed dot sizes for object oriented halftones.

BACKGROUND

Printer controllers and digital front ends (DFEs) have the capability of rendering objects using object oriented halftone patterns. That is, the halftone patterns of objects on a page can have a different frequency and angle for the same color shades. For example, text objects may be halftoned using a halftone screen which is optimized for text objects, background objects can be halftoned using a halftone screen which is optimized for background objects, and the like.

However, the problem with two different halftone patterns touching along a common border is that the patterns may not mesh correctly. As a result, the borderline may be visible and have artifacts. The artifacts may give the appearance of ragged edges at boundaries of the printed object. This may result in a halftone image that has an unacceptable image quality.

SUMMARY

According to aspects illustrated herein, there are provided a method, a non-transitory computer readable medium, and an apparatus for printing. One disclosed feature of the embodiments is a method that selects a first frequency and a first angle for a low frequency halftone, selects a second frequency and a second angle for a high frequency halftone, wherein the high frequency halftone comprises a large dot cluster and a small dot cluster, tags each one of one or more objects in an image to be printed, selects a low frequency halftone or a high frequency halftone for the each one of the one or more objects that are tagged and prints the image in accordance with the low frequency halftone or the high frequency halftone that is selected for the each one of the one or more objects that are tagged.

Another disclosed feature of the embodiments is a non-transitory computer-readable medium having stored thereon a plurality of instructions, the plurality of instructions including instructions which, when executed by a processor, cause the processor to perform operations that selects a first frequency and a first angle for a low frequency halftone, selects a second frequency and a second angle for a high frequency halftone, wherein the high frequency halftone comprises a large dot cluster and a small dot cluster, tags each one of one or more objects in an image to be printed, selects a low frequency halftone or a high frequency halftone for the each one of the one or more objects that are tagged and prints the image in accordance with the low frequency halftone or the high frequency halftone that is selected for the each one of the one or more objects that are tagged.

Another disclosed feature of the embodiments is an apparatus comprising a processor and a computer readable medium storing a plurality of instructions which, when executed by the processor, cause the processor to perform an operation that selects a first frequency and a first angle for a low frequency halftone, selects a second frequency and a second angle for a high frequency halftone, wherein the high frequency halftone comprises a large dot cluster and a small dot cluster, tags each one of one or more objects in an image to be printed, selects a low frequency halftone or a high frequency halftone for the each one of the one or more objects that are tagged and prints the image in accordance with the low frequency halftone or the high frequency halftone that is selected for the each one of the one or more objects that are tagged.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and non-transitory computer-readable medium for printing object oriented halftones. As discussed above, when printing objected oriented halftones with two different halftone patterns, the two different halftone patterns touching along a common border may not mesh correctly. As a result, the borderline may be visible and have artifacts. The artifacts may give the appearance of ragged edges at boundaries of the printed object. This may result in a halftone image that has an unacceptable image quality.

One embodiment of the present disclosure provides a method and apparatus for printing object oriented halftones to reduce the artifacts along a borderline/interface and provides smoother transitions between two different halftones. In one embodiment, a low frequency halftone and a high frequency halftone may be used. In addition, the high frequency halftone may comprise two different cluster sizes that are conjugates of the low frequency halftone. As a result, the artifacts may be reduced along the borderline/interface and smoother transitions may be rendered.

Figure 1:
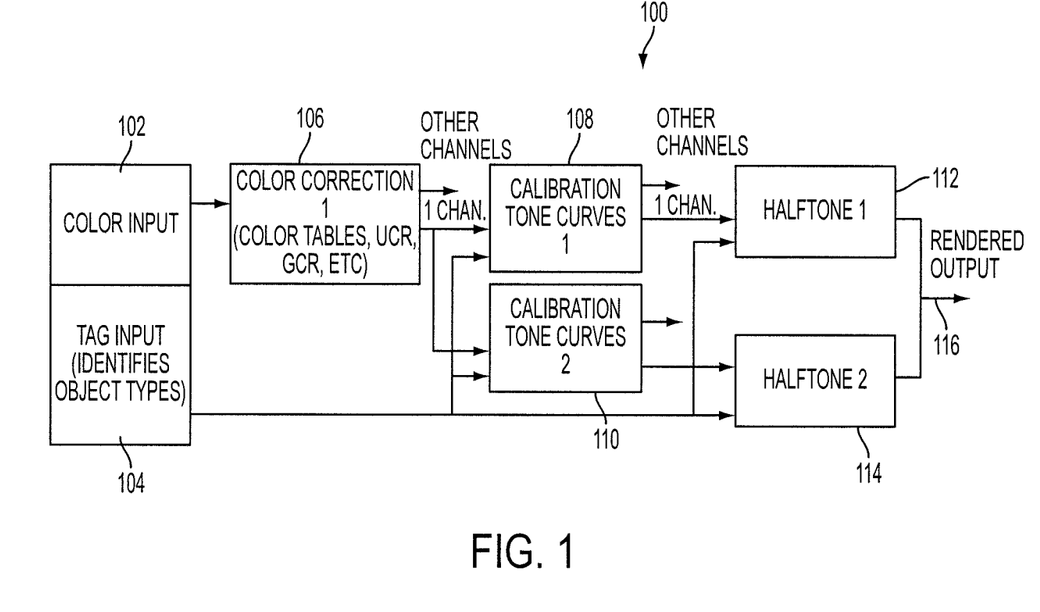
FIG. 1 illustrates an example system for providing a blended halftone with mixed dot sizes.

FIG. 1 illustrates an example system 100 for printing object oriented halftones. In one embodiment, the system 100 may be a printer, multi-function printing device or a digital front end (DFE).

In one embodiment, the system 100 includes a color input module 102, a tag input module 104, a color correction module 106, a first calibration tone curves module 108, a second calibration tone curves module 110, a low frequency halftone module or halftone 1 module 112, a high frequency halftone module or halftone 2 module 114 and a rendered output 116. In one embodiment, the system 100 may have four color channels, each color channel having an associated color correction, calibration tone curve and halftone. However, FIG. 1 has been simplified to illustrate a color path for a single color channel. It should be noted that each one of the modules of the system 100 may be replicated for each color channel for a plurality of color channels.

In one embodiment, the color input module 102 may identify each color of an image to be printed. The color input module 102 may then identify which color channels of the system 100 will render various objects within the image.

In one embodiment, the color correction module 106 may be used to modify the identified color of the image to be printed. For example, various methods may be used for the color correction module 106. Examples of color correction methods may include color tables, under color removal (UCR), gray component replacement (GCR), and the like. In one embodiment, a common color correction table may be used for the low frequency halftone and the high frequency halftone. In another embodiment, the low frequency halftone and the high frequency halftone may have separate respective color correction tables.

In one embodiment, the first calibration tone curves module 108 and the second calibration tone curves module 110 may use a tone reproduction curve (TRC) to modify the tones of the image to be printed. The first calibration tone curves module 108 and the second calibration tone curves module 110 may be used to properly reproduce brightness of the image to be printed. The low frequency halftone and the high frequency halftone may be calibrated independently by adjustments made by the first calibration tone curves module 108 and the second calibration tone curves module 110, respectively.

In one embodiment, the tag input module 104 may be used to tag various objects in the image to be printed. For example, in object oriented printing different objects or segments of an image may be associated with different halftones. The tag input module 104 may properly tag each object in the image to be printed such that the proper halftone or halftones are selected for each one of the objects.

In addition, the tag input module 104 may identify borderlines or interfaces between objects. Along the identified borderlines or interfaces a low frequency halftone and a high frequency halftone of the present disclosure may be used such that the printed image will appear to have a smoother blending along the identified borderlines or interfaces with less artifacts.

In one embodiment, the halftone 1 module 112 may be the low frequency halftone and the halftone 2 module 114 may be the high frequency halftone module. Either, or both, the halftone 1 module 112 and the halftone 2 module 114 may be selected for the color path from the color input module 102 or the object that is tagged from the tag input module 104. In one embodiment, there may be multiple halftone 1 modules 112 and multiple halftone 2 modules 114 for each one of the plurality of color paths or various different objects of the image that is to be printed that may use different halftones.

In one embodiment, the low frequency halftone may have frequencies and angles intended for smoother print quality, such as for example, 150 lines per inch (lpi) to 180 lpi. In one embodiment, the high frequency halftone may have frequencies and angles intended for greater detail and smoother edges, such as for example, 250 lpi or higher.

In one embodiment, the high frequency halftone may be selected such that an optimum frequency and angle are selected that visibly blends with the low frequency halftone pattern along a borderline. In one embodiment, the additional dots that are added for the high frequency halftone may be a conjugate of the low frequency halftone. In one embodiment, the additional dots of the high frequency halftone referred to as the conjugates may be expressed as follows: for a low frequency halftone having a frequency f and an angle α, the additional dots of the high frequency halftone (e.g., the conjugates) may have a frequency of √2×f and an angle of α+45°.

In one embodiment, the high frequency halftones may be defined as having a cluster center of the low frequency halftone synchronized with a cluster center of the high frequency halftone and having a same spatial period. Said another way, the high frequency halftone may have the vector sum of the fundamental or harmonic frequencies of the low frequency halftone. Said yet another way, if a pattern of the high frequency halftone was overlaid on top of a pattern of the low frequency halftone, all of the dot clusters of the low frequency halftones would be covered by a dot cluster of the high frequency halftone.

Figure 2:
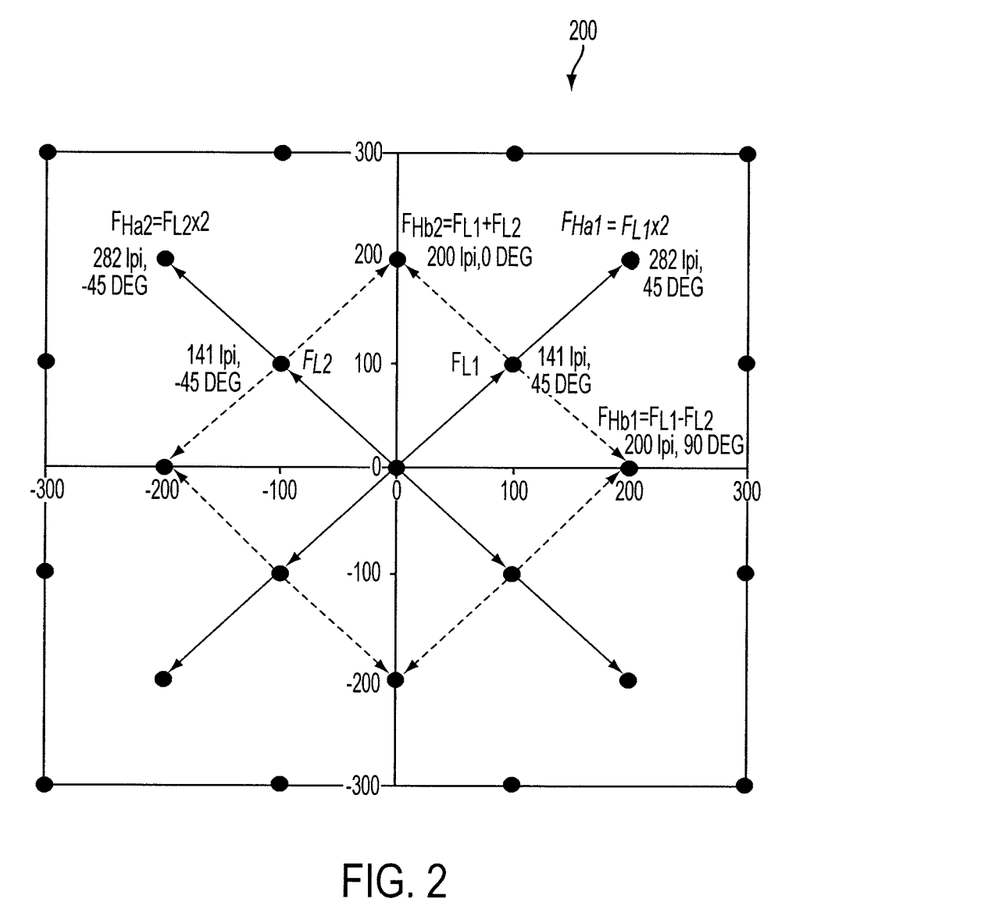
FIG. 2 illustrates an example frequency vector map for calculating a high frequency halftone from a low frequency halftone.

FIG. 2 illustrates an example vector map 200 of lines per inch in the x direction and y direction. The coordinates for centers of a low frequency halftone of 141 lpi and centers for a high frequency halftone of 200 lpi and 282 lpi are illustrated in the vector map 200. Although an example low frequency of 141 lpi and example high frequencies of 200 lpi and 282 lpi are illustrated in FIG. 2, it should be noted that any lpi value may be used for the low frequency and the high frequency.

In one embodiment, given a particular low frequency value, the high frequency or frequencies may be calculated based on the following equations:

$$F_{H1x}=F_{L1x}\times m+/-F_{L1x}\times n \quad (1)$$

$$F_{H1y}=F_{L1y}\times m+/-F_{L1y}\times n \quad (2)$$

$$F_{H2x}=F_{L2x}\times m+/-F_{L2x}\times n \quad (3)$$

$$F_{H2y}=F_{L2y}\times m+/-F_{L2y}\times n \quad (4)$$

$$|F_{H1}|=(F_{H1x}^2+F_{H1y}^2)^{1/2} \quad (5)$$

$$|F_{H2}|=(F_{H2x}^2+F_{H2y}^2)^{1/2} \quad (6)$$

$$A_{H1}=\mathrm{Tan}^{-1}(F_{H1x}/F_{H1y})\times 180/\pi \quad (7)$$

$$A_{H2}=\mathrm{Tan}^{-1}(F_{H2x}/F_{H2y})\times 180/\pi \quad (8)$$

where m and n can be any integer for equations (1)-(8).

Equations 1-8 illustrate the equations for finding the frequency (F) and vector length (|F|) for each high frequency (H1 or H2) dot center relative to the given low frequency and the angle (A) for each of the high frequencies H1, H2 in an x/y coordinate system that represent the lines per inch.

Another method of finding the high frequency halftone may be to calculate a conjugate. In one embodiment, the simplest form of the conjugate may be given a low frequency halftone of frequency f and an angle α, the conjugate dots in the high frequency halftone may have a frequency of √2×f and an angle of α+45°. Examples of finding the conjugate are illustrated in detail in U.S. Pat. No. 7,688,473, assigned to Xerox® Corporation, which is incorporated herein by its entirety.

However, as noted above, simply using a second high frequency halftone may not be enough to prevent visible artifacts between objects along a borderline. Transitions from the low frequency halftone to the high frequency halftone may have higher density spots or white gaps. The large clusters next to an interface border close to smaller clusters may appear darker than desired when printed. Also, depending on the physics of the toner, the electric charges, the transfer belt and fusing, the dot gain may cause the larger dots of the low frequency halftone to join the smaller dots of the high frequency halftone when the pattern is printed. This may make the darks pots even more visible. In other cases, the border could be such that there is a large gap in between the large dots of the low frequency halftone and the smaller dots of the low frequency halftone that creates visible white gaps.

Figure 3:
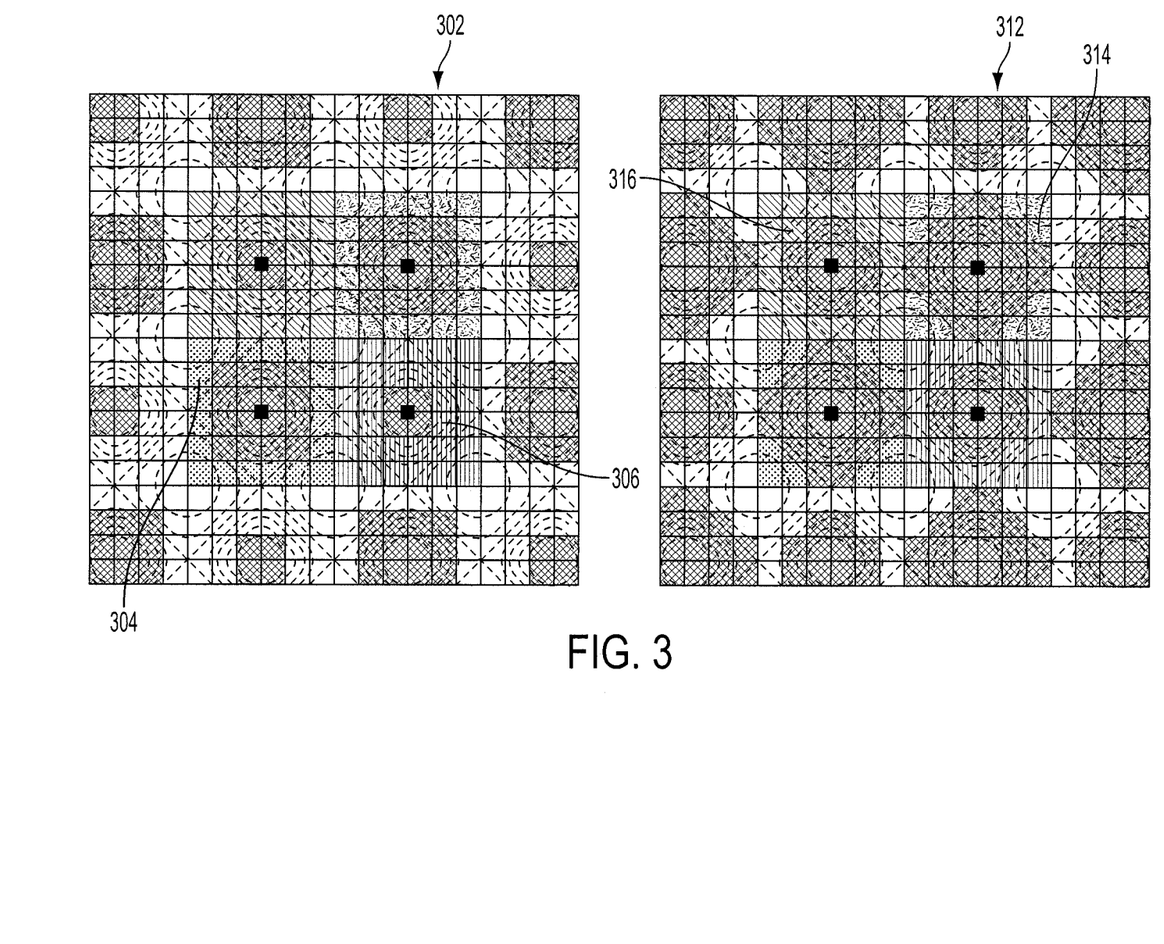
FIG. 3 illustrates a close up image of one embodiment of a light level and a dark level of the high frequency halftone.

To resolve the above problem, one embodiment of the present disclosure provides a set of two different cluster sizes for the high frequency halftone, as illustrated in FIG. 3. In one embodiment, a different set may be associated with each level of an array. For example, some printers may have an array that ranges from 0 to 255. Thus, there may be 256 different sets of cluster sizes for the high frequency halftone for each level of the array. Other printers may have an array of 0 to 511. Thus, there may be 512 different sets of cluster sizes for the high frequency halftone for each level of the array. In contrast, previous methods only used a single set of dot clusters of a single size for the high frequency halftone.

FIG. 3 illustrates a first example 302 for a light level having a large cluster of dots 304 and a small cluster of dots 306 and a second example 312 for a dark level having a large cluster of dots 314 and a small cluster of dots 316. FIG. 3 illustrates only two examples of the high frequency halftone. However, it should be noted that the dot clusters ratio, growth and shape may be adjusted to achieve light levels that are lighter or darker than the examples illustrated in FIG. 3.

In one embodiment, the larger cluster of dots 304 of the first example 302 and the larger cluster of dots 314 of the second example 312 each has the same frequency and angle as selected for the low frequency halftone and each is in phase with the low frequency halftone. The remaining small clusters of dots 306 and 316 of the first example 302 and the second example 312, respectively, are smaller.

In one embodiment, to determine an optimal pixel area for the various sized dot clusters 304, 306, 314 and 316, a pixel area ratio of large dot clusters to small dot clusters may be tuned for all sets, including the first set 302 and the second set 312. For example, if the ratio is too high, the small dots may be too small to be visible. In that case, the blending would appear to be perfect; however, the higher frequency halftone would also be gone. In one embodiment, the ratio should be as low as possible just enough to have both smooth blending and also to keep the print quality characteristics (e.g., a light level, a sharpness, a resolution, and the like) of a high frequency halftone.

In one embodiment, the ratio may be a constant value for an entire range of halftone threshold values. In one embodiment, the halftone threshold values may be a value between 1 and 255.

In another embodiment, the ratio may vary such that the ratio gradually decreases for darker levels. The ratio may also be a function of the type of printer used to print the image. For example, using an IGen printer from Xerox® Corporation, the ratio of large dot clusters 304 to small dot clusters 306 for the first example 302 of the light level may be 4. In one embodiment, the ratio of large dot clusters 314 to small dot clusters 316 for the second example 312 of the dark level may be 2. In another example, for an office printer, the optimal ratio of the light level may be 3.

In addition, to optimize the high frequency halftone for each level of the array (e.g., 0 to 255), the dot growth and shape may be optimized. For example, for darker levels, the dot growth for the large dot clusters and the small dot clusters may be increased, while maintaining the ratio described above. Conversely, for lighter levels, the dot growth for the large dot clusters and the small dot clusters may be decreased, while maintaining the ratio described above. In addition, the shape of the dot clusters may be adjusted to adjust the level. In one embodiment, the dot growth and shape of the large dot clusters 304 and 314 may be similar to a dot growth and shape of the low frequency halftone.

After the dot growth is selected for the large dot clusters 304 and 314 and the small dot clusters 306 and 316, the low frequency halftone and the high frequency halftone may be calibrated with tone curves (e.g., TRC) to achieve a linear response from paper white to maximum density. In one embodiment, blending between the low frequency halftone and the high frequency halftone is better if both the low and high frequency halftones are calibrated using the same method and performed independently from one another.

Figure 4:
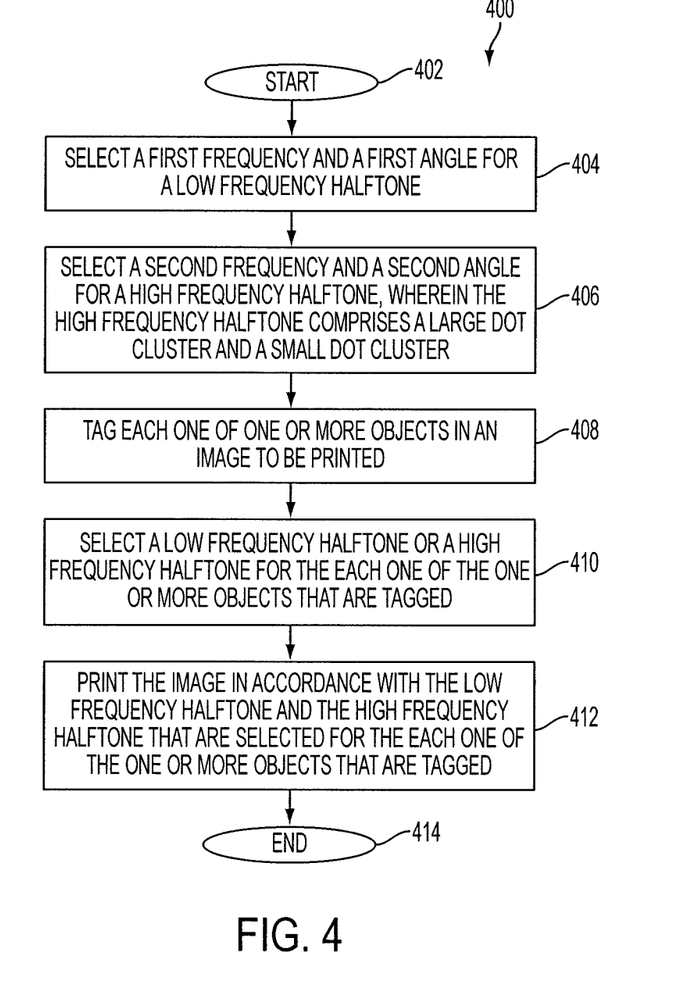
FIG. 4 illustrates an example flowchart of a method for preparing halftones and printing using object oriented halftones.
Figure 5:
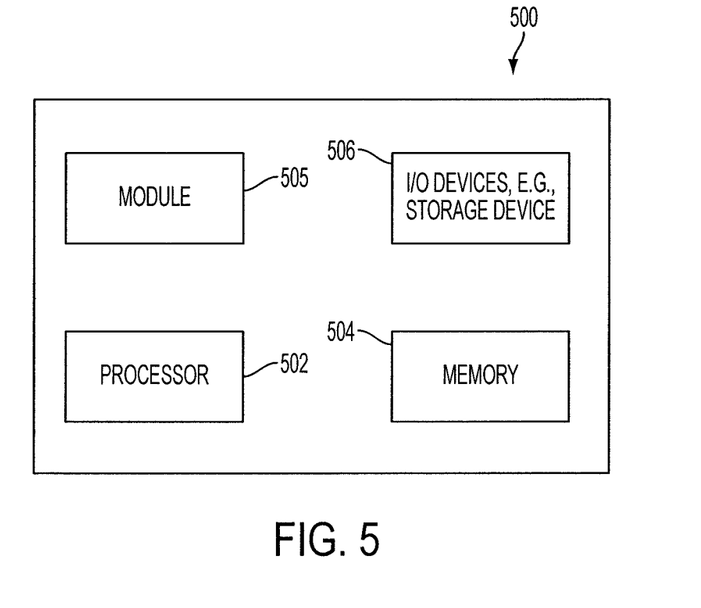
FIG. 5 illustrates a high-level block diagram of a general-purpose computer suitable for use in performing the functions described herein.

FIG. 4 illustrates a flowchart of a method 400 for preparing halftones and printing using object oriented halftones. In one embodiment, one or more steps or operations of the method 400 may be performed by the printing system 100 or a general-purpose computer as illustrated in FIG. 5 and discussed below.

The method 400 begins at step 402. At step 404, the method 400 selects a first frequency and a first angle for a low frequency halftone. For example, the low frequency halftone may be selected to have a frequency that is intended for smoother print quality, such as for example, 150 lpi to 180 lpi.

At step 406, the method 400 selects a second frequency and a second angle for a high frequency halftone, wherein the high frequency halftone comprises a large dot cluster and a small dot cluster. In one embodiment, the high frequency halftone may include two different sized dot clusters. The size, shape and ratio of pixel area of the large dot cluster and the small dot cluster may be a function of a level selected in a printing array. For example, if a darker level is selected, the size, shape and ratio may be tuned to reduce the amount of white pixels, while still providing a smooth transition at an interface of the low frequency halftone and the high frequency halftone. For example, if the levels of the array are 0 to 255, there may be 256 different high frequency halftones wherein each one of the high frequency halftones has different sizes, shapes and ratios for a respective large dot cluster and a respective small dot cluster.

In one embodiment, Equations 1-8 may be used to determine a high frequency halftone that is a conjugate of the low frequency halftone or the vector sum of the fundamental or harmonic frequencies of the low frequency halftone. In one embodiment, the large cluster of dots have the same frequency and angle as selected for the low frequency halftone and are also in phase with the low frequency halftone.

In one embodiment, to determine an optimal pixel area for the various sized dot clusters, a ratio of large dot clusters to small dot clusters may be tuned for the high frequency halftone. For example, if the ratio is too high, the small dots may be too small to be visible. In that case, the blending would appear to be perfect; however, the higher frequency halftone would also be gone. In one embodiment, the ratio should be as low as possible just enough to have both smooth blending and also to keep the print quality characteristics of a high frequency halftone.

In one embodiment, the ratio may be a constant value for an entire range of halftone threshold values. In another embodiment, the ratio may vary such that the ratio gradually decreases for darker levels. The ratio may also be a function of the type of printer used to print the image.

In one embodiment, after the low frequency halftone and the high frequency halftone are calculated, the low frequency halftone and the high frequency halftone may each be independently calibrated using TRCs.

At step 408, the method 400 tags each one of one or more objects in an image to be printed. For example, the printing system for a DFE may tag each object in the image to be printed and identify borderlines or interfaces between the objects such that the appropriate halftone may be selected for the object.

At step 410, the method 400 selects a low frequency halftone or a high frequency halftone for the each one of the one or more objects that are tagged. For example, each object of an image to be printed may be associated with a different halftone. Thus, different low frequency halftone/high frequency halftone combinations may be available. One of the low frequency/high frequency halftone combinations may be selected for rendering each object ready for printing. In one embodiment, the halftone for each color channel may also be selected.

At step 412, the method 400 prints the image in accordance with the low frequency halftone and the high frequency halftone that are selected for the each one of the one or more objects that are tagged. The method then proceeds to step 414 where the method 400 ends.

It should be noted that although not explicitly specified, one or more steps, functions, or operations of the method 400 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIG. 4 that recite a determining operation, or involve a decision, do not necessarily require that both branches of the determining operation be practiced. In other words, one of the branches of the determining operation can be deemed as an optional step.

FIG. 5 depicts a high-level block diagram of a general-purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for preparing halftones and printing using object oriented halftones, and various input/output devices 506 (e.g., storage devices, including but not limited to, a tape drive, a floppy drive, a hard disk drive or a compact disk drive, a receiver, a transmitter, a speaker, a display, a speech synthesizer, an output device (such as a graphic display, printer, and the like), an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps of the above disclosed methods. In one embodiment, the present module or process 505 for preparing halftones and printing using object oriented halftones can be loaded into memory 504 and executed by processor 502 to implement the functions as discussed above. As such, the present method 505 for preparing halftones and printing using object oriented halftones (including associated data structures) of the present disclosure can be stored on a non-transitory (e.g., physical and tangible) computer readable storage medium, e.g., RAM memory, magnetic or optical drive or diskette and the like. For example, the hardware processor 502 can be programmed or configured with instructions (e.g., computer readable instructions) to perform the steps, functions, or operations of method 400.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for printing, comprising:
selecting, by a processor, a first frequency and a first angle for a low frequency halftone;
selecting, by the processor, a second frequency and a second angle for a high frequency halftone, wherein the high frequency halftone comprises a large dot cluster and a small dot cluster, wherein a frequency and an angle of the large dot cluster of the high frequency halftone is same as the first frequency and the first angle of a dot cluster of the low frequency halftone;
tagging, by the processor, each one of one or more objects in an image to be printed;
selecting, by the processor, the low frequency halftone or the high frequency halftone for the each one of the one or more objects that are tagged; and
causing, by the processor, a printer to print the image in accordance with the low frequency halftone or the high frequency halftone that is selected for the each one of the one or more objects that are tagged.

2. The method of claim 1, wherein the high frequency halftone includes additional dots that are a conjugate of the low frequency halftone having a frequency f and an angle $\alpha$.

3. The method of claim 2, wherein the conjugate is defined as the additional dots of the high frequency halftone that have a frequency of $\sqrt{2} \times f$ and an angle of $\alpha + 45°$.

4. The method of claim 1, wherein a ratio of a pixel area of the large dot cluster versus a pixel area of the small dot cluster is tuned to optimize blending of a border between the low frequency halftone and the high frequency halftone.

5. The method of claim 4, wherein a shape and a dot growth of the large dot cluster and the small dot cluster are selected based upon a level of an array that is selected.

6. The method of claim 5, wherein the shape and the dot growth of the large dot cluster and the small dot cluster are selected while maintaining the ratio of the pixel area that optimizes blending of the border and keeps one or more print quality characteristics of the high frequency halftone.

7. The method of claim 4, wherein the ratio is 4.

8. The method of claim 1, further comprising:
calibrating, by the processor, the low frequency halftone and the high frequency halftone with a respective tone reproduction curve (TRC).

9. A non-transitory computer-readable medium storing a plurality of instructions which, when executed by a processor, cause the processor to perform operations for printing, the operations comprising:
selecting a first frequency and a first angle for a low frequency halftone;
selecting a second frequency and a second angle for a high frequency halftone, wherein the high frequency halftone comprises a large dot cluster and a small dot cluster, wherein a frequency and an angle of the large dot cluster of the high frequency halftone is same as the first frequency and the first angle of a dot cluster of the low frequency halftone;
tagging each one of one or more objects in an image to be printed;

selecting the low frequency halftone or the high frequency halftone for the each one of the one or more objects that are tagged; and printing the image in accordance with the low frequency halftone or the high frequency halftone that is selected for the each one of the one or more objects that are tagged.

10. The non-transitory computer-readable medium of claim 9, wherein the high frequency halftone includes additional dots that are a conjugate of the low frequency halftone having a frequency f and an angle $\alpha$.

11. The non-transitory computer-readable medium of claim 10, wherein the conjugate is defined as the additional dots of the high frequency halftone that have a frequency of $\sqrt{2} \times f$ and an angle of $\alpha+45°$.

12. The non-transitory computer-readable medium of claim 9, wherein a ratio of a pixel area of the large dot cluster versus a pixel area of the small dot cluster is tuned to optimize blending of a border between the low frequency halftone and the high frequency halftone.

13. The non-transitory computer-readable medium of claim 12, wherein a shape and a dot growth of the large dot cluster and the small dot cluster are selected based upon a level of an array that is selected.

14. The non-transitory computer-readable medium of claim 13, wherein the shape and the dot growth of the large dot cluster and the small dot cluster are selected while maintaining the ratio of the pixel area that optimizes blending of the border and keeps one or more print quality characteristics of the high frequency halftone.

15. The non-transitory computer-readable medium of claim 12, wherein the ratio is 4.

16. The non-transitory computer-readable medium of claim 9, further comprising:

calibrating the low frequency halftone and the high frequency halftone with a respective tone reproduction curve (TRC).

17. A method for printing, comprising:

selecting, by a processor, a first frequency and a first angle for a low frequency halftone;

selecting, by the processor, a second frequency and a second angle for a high frequency halftone, wherein the high frequency halftone comprises a large dot cluster and a small dot cluster, wherein a pixel area ratio of the large dot cluster versus the small dot cluster is tuned to optimize blending of a border between the low frequency halftone and the high frequency halftone, wherein a shape and a dot growth of the large dot cluster and the small dot cluster are selected based upon a level of an array that is selected while maintaining the pixel area ratio;

calibrating, by the processor, the low frequency halftone and the high frequency halftone with a tone reproduction curve (TRC);

tagging, by the processor, each one of one or more objects in an image to be printed;

selecting, by the processor, the low frequency halftone or the high frequency halftone for the each one of the one or more objects that are tagged; and causing, by the processor, a printer to print the image in accordance with the low frequency halftone or the high frequency halftone that is selected for the each one of the one or more objects that are tagged.

18. The method of claim 17, wherein the pixel area ratio is 4.

* * * * *